United States Patent Office 3,294,409
Patented Dec. 27, 1966

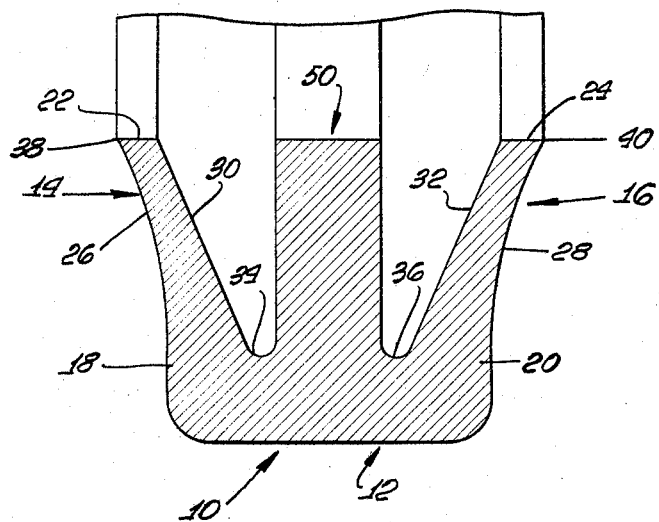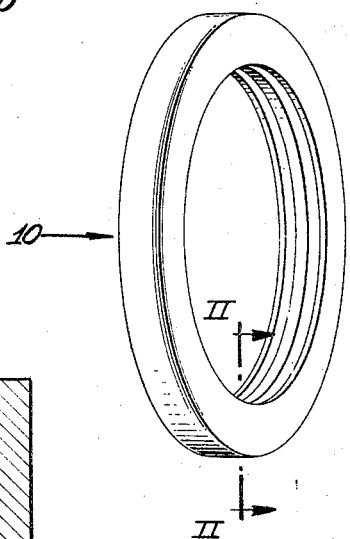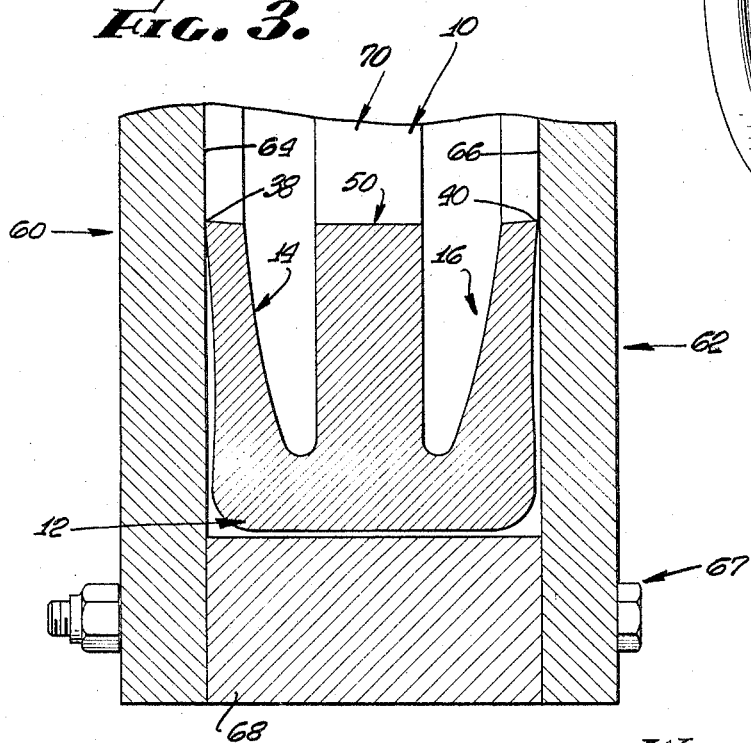

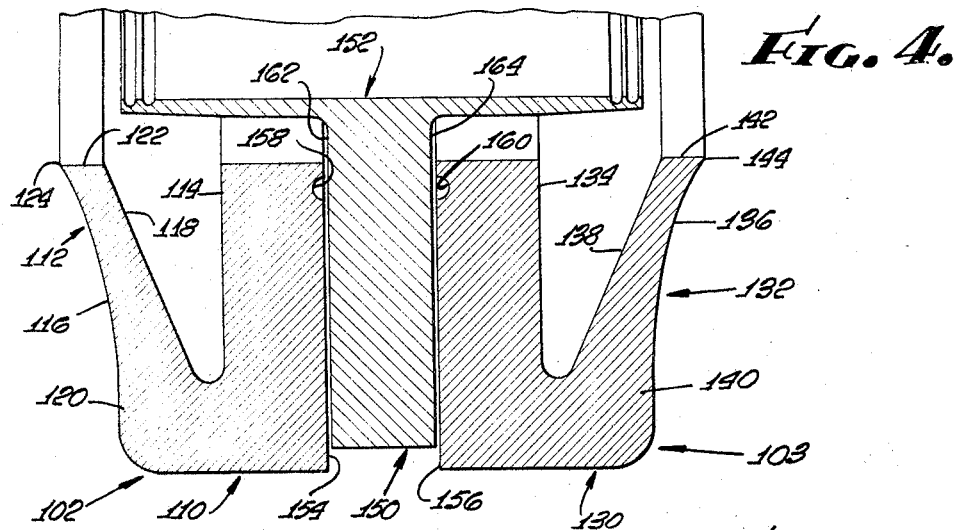
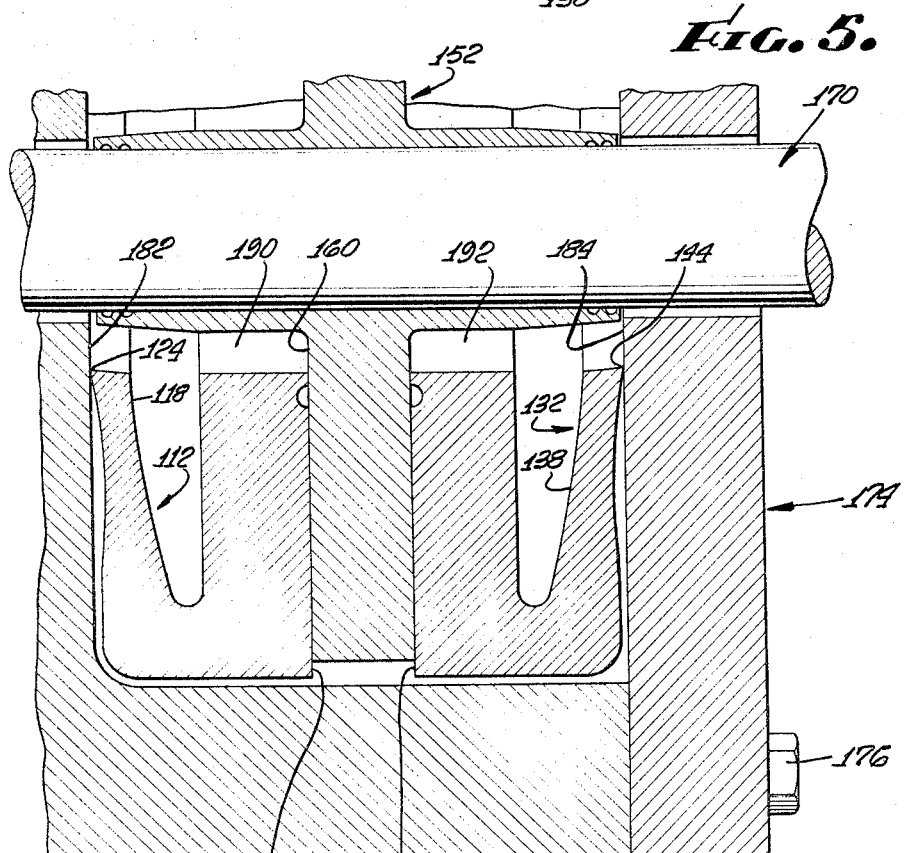

3,294,409
METAL SEAL CONSTRUCTION
Wilson A. Burtis, Inglewood, Calif., assignor to Dover Corporation, Louisville, Ky., a corporation of Delaware
Filed Feb. 20, 1963, Ser. No. 259,838
3 Claims. (Cl. 277—188)

This invention relates generally to seals and more specifically to improvements in metal seals.

The seal in accordance with the present invention is adapted to meet modern requirements of preventing leakage of fluid under pressures of 5000 p.s.i.g. and higher, and cycled pressure impulses creating pressure gradients exceeding 100,000 p.s.i. per second. The construction is such as to permit appreciable relative movement of the workpieces or structural members defining the cavity in which the present device is disposed, without impairing the efficacy of its sealing function, and the seal may be reused a number of times without loss of sealing ability.

In the preferred form of the invention, hereinafter described and illustrated in detail, the seal is in the form of an annular body having a shape as seen in transverse section approximating a block letter W, with the outer arms and central leg extending generally radially inwardly toward the pressure fluid. With the seal in unstressed condition, the outer arms of the W are divergent from their roots or base portion of the seal, and the outwardly facing surfaces of the outer arms are concave, the outer edges of the distal ends of the arms constituting the sealing edges. When the seal is mounted in a suitable cavity defined by opposed hardened surfaces of workpieces, the workpiece surfaces force the seal outer arms inwardly or toward one another. Thus these arms are stressed when in sealing position, and the concavity of their outer surfaces, together with the fact that their inner surfaces are essentially flat, provides a cross-sectional area decreasing from root to tip. As a result, the unit stress is virtually uniform throughout the arms, so that the strength of the metal is most effectively used for a seal of given weight. The geometry of the cavity is such that the stress remains below the elastic limit of the material, and accordingly no permanent deformation or set takes place. Thus the seal is reusable and is essentially self-energized when in sealing position. The force of fluid pressure within the cavity exerted against the arm inner walls decreases the effective stress in the arms. The seal is accordingly useful over very wide ranges of temperature and fluid pressure.

The central portion or leg of the letter W provides, with minimum added weight, substantially greater radial stiffness and reduces hoop stress in the seal, which if not reduced would tend to rotate the arms away from their sealing contact with the workpiece faces, permit seal movement and resultant galling of the faces and reduce the effective life of the seal.

Accordingly it is a principal object of the present invention to provide a novel metal-to-metal seal. Other objects are to provide such a device in annular form wherein the sealing edge is at the distal end of a continuous annular lip constituting an arm as seen in section, the metal of the arm being stressed substantially uniformly throughout its length when the seal is in sealing relation with a workpiece; to provide such a device wherein fluid pressure creates a force decreasing the effective stress in such lip; to provide such a device wherein the line contact sealing edge or edges undergo virtually no movement relative to faces of workpieces against which they bear, regardless of variations in fluid pressure; and for other and additional objects and purposes as will become clear from a reading of the following description of exemplary embodiments thereof taken in connection with the accompanying drawings in which:

FIG. 1 is a perspective view of an annular seal in accordance with a preferred embodiment of the invention.

FIG. 2 is a transverse sectional view on an enlarged scale taken on line II—II of FIG. 1, the seal being unstressed.

FIG. 3 is a sectional view of the device of FIG. 2 mounted in a cavity fragmentarily shown, the seal being in a sealing relation with faces of workpieces defining the cavity.

FIG. 4 is a transverse sectional view corresponding to FIG. 2 but showing an alternative form of the invention adapted to be used with a bearing.

FIG. 5 is a sectional view of the form of the invention shown in FIG. 4 mounted in a cavity fragmentarily shown, together with a shaft journaled in the bearing.

Referring now in detail to the drawings, there is shown in FIG. 1 a preferred embodiment of the seal in accordance with the present invention. As there appears, the seal is generally annular, and its shape as seen in transverse section, as shown in FIG. 2, resembles a block letter W. Thus the seal indicated generally at 10 includes a base portion indicated generally at 12 and a pair of laterally spaced preferably symmetrical arms indicated respectively at 14 and 16 extending generally radially inwardly from the base 12 and formed integrally therewith. It will be understood that the arms are in fact continuous annular lips, but are referred to herein as arms because of their appearance seen in section. The arms diverge from one another in their extent from their root portions 18 and 20 respectively at base 12 to their distal ends 22 and 24 respectively. The outwardly facing surfaces 26 and 28 respectively of the arms are formed to be concave, while the inwardly facing surfaces 30 and 32 respectively of the arms are flat as seen in section, being actually substantially frusto-conical. These inwardly facing surfaces join the base 12 in curved juncture portions 34 and 36 respectively at the roots of the arms.

The axially outermost tips 38 and 40 respectively of the arms are by preference rounded as by a very small radius, of the order of 0.001 inch or less, forming a line contact for the sealing edges when the seal is mounted in sealing relation between the faces of two metallic structural members or workpieces.

The concave outwardly facing surfaces 26 and 28 of the arms are preferably formed by radii from points in general alignment with or slightly below the roots of the arms, the radii having values somewhat greater than the length of the arms from root to distal end, preferably of the order of from two to three times such arm length. As a result, and keeping in mind the frusto-conical shape of the inwardly facing surfaces of the arms, the cross-sectional area of each arm decreases from the root to the distal end, so that the unit stress is substantially uniform throughout the length of the arm when the seal is in operative sealing position in a cavity as will be described in connection with FIG. 3.

Intermediate the two arms 14 and 16, and projecting radially inwardly from the base 12 there may be provided an annular rib or strut, seen in the sectional view of FIG. 2 as a central leg indicated generally at 50. Depending upon design considerations and the magnitude of pressure to be sealed by the present device, the inward extent of the central leg 50 may be generally similar to the length of each of the arms 14 and 16.

In FIG. 3 the seal of the present invention is shown in operative sealing position between hardened faces of spaced workpieces. Thus in FIG. 3 two workpieces indicated generally at 60 and 62 have hardened inner faces 64 and 66 respectively, the two workpieces being held in assembled relation by suitable fastening means indicated generally at 67 passing through a spacer member 68 between the workpieces. The seal 10 is disposed within the cavity formed by the workpieces and spacer, base 12 being desirably spaced from the spacer, and it will be noted that the distance between the inner faces 64 and 66 of the workpieces when in assembled relation is substantially less than the distance between the sealing edges or tips 38 and 40 when the seal is in unstressed condition as seen in FIG. 2. It will thus be understood that the arms are forced inwardly toward one another by the workpieces whose inner faces define the axial extent of the cavity indicated generally at 70. The stress thus imposed upon the arms is made to be somewhat less than the elastic limit of the metal used for the seal, and, as previously pointed out, the shape of the arms is such that the stress is subtantially uniform throughout the length of the arms from their roots to their distal ends.

It is to be particularly noted that the force of fluid under pressure in cavity 70 is exerted outwardly against the side walls 30 and 32 constituting the inwardly directed surfaces of arms 14 and 16 respectively. Since the metal in those arms, aside from the effect of pressure fluid, is prestressed up to a value not far below the elastic limit of the material throughout the lengths of the arms by reason of bearing against faces 64 and 66 as previously described, it will be seen that fluid pressure exerted against the arm inner surfaces 30 and 32 as above described tends to decrease the stress within the arms created by their being deformed within the cavity. At the same time, the outwardly exerted force of pressure fluid in the cavity against the arms serves to augment the outward bearing pressure along the line contacts 38 and 40 constituting the sealing edges of the present device.

The combination of forces as above described results in virtually zero movement of the sealing edges relative to the faces 64 and 66 of the workpieces over extreme pressure variations, so that galling of such faces is virtually completely eliminated.

Flexibility of adaptation for various uses and applications of the principles of the present seal may be enhanced by effectively splitting the W centrally thereof and receiving between the two split portions of the seal one or more additional structural elements with which the seal cooperates. Such an arrangement is shown in FIGS. 4 and 5 wherein the embodiment of the invention there shown is applied to sealing in connection with a movable shaft journalled for axial or rotational movement in a flanged bearing member forming part of the seal, and the construction further incorporates self-aligning or adjustability features of such shaft relative to the seal.

In FIG. 4, the seal is of two part construction including a left-hand part as there seen indicated generally at 102 and a right-hand part as there seen indicated generally at 103. It will be understood that FIG. 4 is a transverse sectional view corresponding generally to FIG. 2 and showing the parts in unstressed condition. Seal part 102 includes a base portion indicated generally at 110 and integrally formed therewith and extending generally radially inwardly therefrom, an arm indicated generally at 112 and a leg 114. Arm 112 is formed similarly to arm 14 previously described in connection with FIG. 2, including a concave outwardly directed surface 116 and an inwardly directed surface 118 which is essentially frusto-conical in shape, thereby affording the characteristic tapering cross-sectional area from the root portion 120 adjacent base 110 to the distal end 122 of the arm, as discussed in connection with FIG. 2. The axially outermost edge 124 or arm 112 may be slightly rounded as by a radius of 0.001 inch or less, constituting the line contact sealing edge of the arm when it is in sealing position.

Seal part 103 is symmetrically disposed relative to seal part 102 and includes a base portion indicated generally at 130, an integrally formed arm indicated generally at 132 and a leg 134, the arm being defined outwardly by a concave outer wall 136 and inwardly by a frusto-conical wall 138, so that the cross-sectional area of the arm tapers from a maximum at the root 140 to a minimum at the distal end of the arm 142. The axially outermost edge 144 of the arm is slightly rounded in the same manner as edge 124 just mentioned.

Between seal part 102 and 103 the seal of FIG. 4 included a flanged member, comprising a flange indicated generally at 150 extending radially outwardly from and desirably formed integrally with an axially extending bearing-like portion indicated generally at 152. The otherwise flat inwardly directed surfaces 154 and 156 of seal parts 102 and 103 respectively may include reliefs 158 and 160, and the side walls 162 and 164 of the flange 150 are flat.

In FIG. 5 the seal construction of FIG. 4 is shown mounted in a suitable cavity formed by metallic structural members or workpieces, with a shaft indicated generally at 170 movably and sealably journaled in bearing 152. It will be seen that the bearing portion 152 constitutes effectively a portion of the seal preventing fluid movement axially of the shaft sealably journaled therein, although it does not function as a bearing in the sense of supporting the weight of the shaft. Thus, workpieces indicated generally at 172 and 174 may be retained in assembled relation as shown by suitable means 176, the workpieces being provided with bores 178 and 180 respectively formed therein, through which shaft 170 extends. The workpieces 172 and 174 include inwardly directed flat hardened faces 182 and 184 respectively. With the parts in assembled relation as seen in FIG. 5, the arms 112 and 132 of the seal part 102 and 103 respectively are prestressed by reason of the geometry of the cavity, so that the sealing edges 124 and 144 are forced outwardly by such stress into sealing line contact with the faces 182 and 184. As in the case of the embodiment of the invention first shown and described in connection with FIGS. 1-3, pressure fluid within the cavities 190 and 192 exerts a force against the respective arm walls 118 and 138, and the stress in the arm resulting from such force acts oppositely to the stress created by the initial deformation of the arm, thus decreasing the effective stress in the same manner as previously described in connection with FIGS. 2 and 3.

A certain amount of radial movement of flange 150 can take place relative to seal parts 110 and 130 by reason of the virtual planarity of flange side walls 162, 164 and of seal part side walls 154, 156, and of the resulting small unit bearing loading therebetween. Because of this fact and the effective sealing afforded by the fit of the shaft in bearing 152, the construction of FIG. 5 constitutes a dynamic shaft seal and permits, within a reasonably wide range, alignment of the bearing axis relative to the seal.

It is to be noted that no portions of the seal except the line contact sealing edges touch the structural members or workpieces defining the cavity in which the seal is housed.

Modifications and changes from the exemplary embodiments of the invention herein shown and described not substantially departing therefrom are intended to be embraced within the scope of the following claims.

I claim:
1. A metal seal construction for sealing between spaced metallic members, the seal being generally annular in form and having, as seen in transverse section and without external force applied thereto, a shape comprising:
    an axially extending base portion;
    a pair of arms having axially spaced roots formed integrally with the base and extending generally radially inwardly therefrom and divergent from one another,
    whereby the distal ends of the arms are spaced apart substantially more than said roots, the axially outwardly facing surfaces of the arms being concave throughout substantial portions thereof from the distal ends toward the roots and the axially outermost edges of said arms constituting sealing edges in continuous line contact with said spaced metallic members;

and a reinforcing central leg formed integrally with the base intermediate the arms and extending radially inwardly from the base substantially the same distance as the radial extent of the arms.

2. The invention as stated in claim 1 wherein the cross-sectional area of said arms increases from the distal ends toward the roots.

3. The invention as stated in claim 1 wherein the unit stress within said arms is substantially uniform throughout the length of the arms when the arms are forced toward one another by sealing contact between axially outwardly directed edges of the distal ends of the arms and faces of metallic structural members.

References Cited by the Examiner

UNITED STATES PATENTS 1,866,160  7/1932  Griswold _____ 277—180 X

FOREIGN PATENTS 462,424  11/1913  France.
1,222,943  1/1960  France.
44,867  2/1928  Norway.

SAMUEL ROTHBERG, *Primary Examiner.*

LAVERNE D. GEIGER, *Examiner.*